US008854414B2

(12) United States Patent
Ding (10) Patent No.: US 8,854,414 B2
(45) Date of Patent: Oct. 7, 2014

(54) METHOD, APPLICATION SERVER AND SYSTEM FOR PRIVACY PROTECTION IN VIDEO CALL (75) Inventor: Xiangjun Ding, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 304 days.

(21) Appl. No.: 13/497,124

(22) PCT Filed: Aug. 23, 2010

(86) PCT No.: PCT/CN2010/076252
§ 371 (c)(1),
(2), (4) Date: Mar. 20, 2012

(87) PCT Pub. No.: WO2011/035670
PCT Pub. Date: Mar. 31, 2011

(65) Prior Publication Data
US 2012/0182379 A1    Jul. 19, 2012

(30) Foreign Application Priority Data
Sep. 24, 2009   (CN) .......................... 2009 1 0190278

(51) Int. Cl.
H04N 7/14          (2006.01)
(52) U.S. Cl.
CPC ..................................... H04N 7/147 (2013.01)
USPC ........ 348/14.02; 348/143; 348/159; 348/169; 348/222.1; 380/205; 382/100; 715/716; 725/32
(58) Field of Classification Search
CPC ....... H04N 7/142; H04N 7/147; H04N 1/181; H04N 5/232; G08B 13/19686
USPC ................... 348/14.02, 143, 159, 169, 222.1; 380/205; 382/100; 705/10; 715/716; 725/32
See application file for complete search history.

(56) References Cited

U.S. PATENT DOCUMENTS 6,825,873 B2 * 11/2004 Nakamura et al. .......... 348/14.02
7,360,160 B2 *  4/2008 Matz ............................. 715/716
(Continued)

FOREIGN PATENT DOCUMENTS

CN   1717084 A   1/2006
CN   1825942 A   8/2006
(Continued)

OTHER PUBLICATIONS

International Search Report for PCT/CN2010/076252 dated Oct. 20, 2010.

Primary Examiner — Gerald Gauthier
(74) Attorney, Agent, or Firm — Stephen Yang; Ling Wu; Ling and Yang Intellectual Property (57) ABSTRACT The present invention discloses a method, an application server and a system for privacy protection in a video call, which are applied in a video call between a first terminal and a second terminal, wherein the method includes: judging whether to perform privacy protection on the first terminal; and when determining to perform privacy protection on the first terminal, playing a substitute video in a media server as a video of the first terminal to the second terminal. Using the method, the application server and the system disclosed by the present invention when performing a video call between the first terminal and the second terminal not only avoids leakage of a user's own privacy and embarrassment, but also guarantees a normal operation of the video call, thus improving the convenience of 3G services.

9 Claims, 4 Drawing Sheets

(56) References Cited

U.S. PATENT DOCUMENTS

| | | | |
|---|---|---|---|
| 8,194,127 B2 * | 6/2012 | Kang et al. | 348/143 |
| 2003/0051238 A1 * | 3/2003 | Barone, Jr. | 725/32 |
| 2007/0201694 A1 * | 8/2007 | Bolle et al. | 380/205 |
| 2009/0096859 A1 * | 4/2009 | Jeong | 348/14.02 |
| 2009/0128632 A1 * | 5/2009 | Goto et al. | 348/169 |
| 2009/0207269 A1 * | 8/2009 | Yoda | 348/222.1 |
| 2010/0063866 A1 * | 3/2010 | Kinoshita et al. | 705/10 |
| 2011/0158470 A1 * | 6/2011 | Martin et al. | 382/100 |
| 2012/0182379 A1 * | 7/2012 | Ding | 348/14.02 |
| 2012/0307073 A1 * | 12/2012 | Senior | 348/159 |

FOREIGN PATENT DOCUMENTS

| | | |
|---|---|---|
| CN | 101193261 A | 6/2008 |
| CN | 101668157 A | 3/2010 |

* cited by examiner

METHOD, APPLICATION SERVER AND SYSTEM FOR PRIVACY PROTECTION IN VIDEO CALL

TECHNICAL FIELD

The present invention relates to a network communication technology, and in particular, to a method, an application server and a system for privacy protection in a video call.

BACKGROUND OF THE RELATED ART

Figure 1:
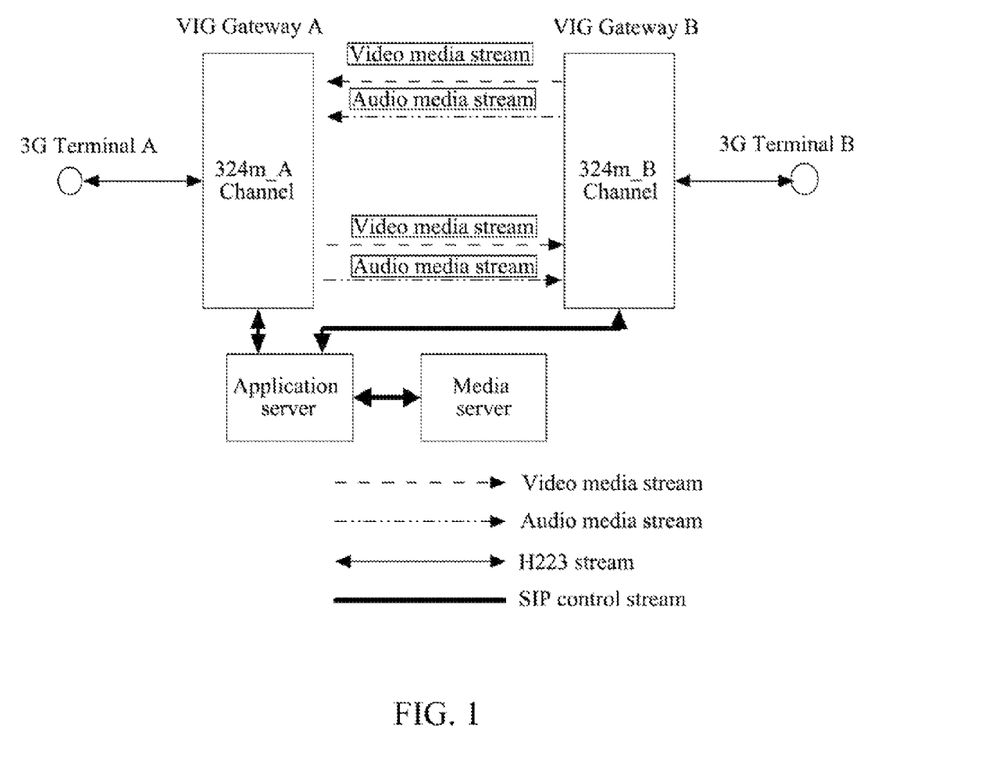
FIG. 1 illustrates a block diagram of a video call in the related art.

With the videophone of the age of the 3rd Generation (3G) mobile communication technology, both parties can see videos of each other in a call. As shown in FIG. 1, a video call is performed by directly selecting a "video call" button when a number of the other party is called through a 3G mobile terminal. The callee can answer the call as if answering an ordinary phone. At this time, the mobile terminals of the both parties automatically start the cameras, perform camera shooting for a user, and the 3G terminal A encodes the video captured from the camera and audio data captured from a microphone through a video/audio encoder in the interior of the terminal, and then multiplexes the encoded video and audio with data and control streams into a single bit stream through multiplexing protocol H.223 and then de-multiplexes the H.223 data into video and audio code streams through a Video Gateway (VIG) A, and subsequently, carries the video and audio code streams in an IP network to transmit to the opposite end. The VIG is an interworking gateway between a circuit switched domain and a packet switched domain. A VIG B to which an opposite end 3G terminal is connected multiplexes the audio/video code streams carried in the IP network into H.223 data to transmit to a callee, i.e., 3G terminal B, and the 3G terminal B firstly de-multiplexes the H.223 bit streams into audio/video code streams, and then decodes the audio/video code streams into audio/video data through an internal decoder to output to a display and an earphone of the 3G terminal, and both parties can see video images of each other and hear voice of each other only after approximately less than 1 second.

However, for most of consumers, it is not always required to show their own videos to the other party each time in a video call, and sometimes, it may be required to hide their own videos, for example, answering a call when having a bath, going to the washroom or answering a call at other times when it is inconvenient to show their own videos, and so on. At this time, connecting their own videos to the other party will make their own privacy gone. How to effectively prevent such events from occurring and make the user use the 3G video call function without scruple becomes particularly important.

SUMMARY OF THE INVENTION

The purpose of the present invention is to provide a method, an application server and a system for privacy protection in a video call, which can avoid leakage of a user's own privacy and appearance of embarrassed scenes, so that there is no obstruction for a 3G video call.

The present invention provides a method for privacy protection in a video call, which is applied in a video call between a first terminal and a second terminal, comprising:

judging whether to perform privacy protection on the first terminal; and when determining to perform privacy protection on the first terminal, playing a substitute video in a media server as a video of the first terminal to the second terminal.

Said step of playing a substitute video in a media server as a video of the first terminal to the second terminal can comprise:

transmitting a first control instruction to a VIG of the first terminal, wherein the first control instruction can be used to control the VIG of the first terminal to set a remote address of video transmitting address information of the first terminal to be invalid; transmitting a second control instruction to the media server, wherein the second control instruction can be used to control the media server to analyze the substitute video and a video transmitting address of the substitute video; and transmitting a third control instruction to a VIG of the second terminal, wherein the third control instruction can be used to control the VIG of the second terminal to set a remote address of video receiving address information of the second terminal to be the video transmitting address of the substitute video which is analyzed by the media server.

Said step of judging whether to perform privacy protection on the first terminal can comprise:

judging whether the first terminal is a subscriber under the privacy protection, and whether an instruction for enabling the privacy protection is received from the first terminal; and if the first terminal is a subscriber and the instruction for enabling the privacy protection is received, determining to perform privacy protection on the first terminal; otherwise, determining not to perform privacy protection on the first terminal.

The method can further comprise:

when receiving an instruction for stopping the privacy protection from the first terminal, transmitting a first switching instruction to the VIG of the first terminal, wherein the first switching instruction can be used to control the VIG of the first terminal to set the remote address of the video transmitting address information of the first terminal as a video receiving address of the VIG of the second terminal; transmitting a second switching instruction to the media server, wherein the second switching instruction can be used to control the media server to close a channel corresponding to the analyzed video transmitting address of the substitute video; and transmitting a third switching instruction to the VIG of the second terminal, wherein the third switching instruction can be used to control the VIG of the second terminal to set the remote address of the video receiving address information of the second terminal as the video transmitting address of the VIG of the first terminal.

The first control instruction, the second control instruction and the third control instruction can be session initiation protocol messages.

The first switching instruction, the second switching instruction and the third switching instruction can be session initiation protocol messages.

The present invention provides an application server, which is used to implement privacy protection in a video call between a first terminal and a second terminal, comprising:

a judging module, configured to judge whether to perform privacy protection on the first terminal; and a control module, configured to play a substitute video in a media server as a video of the first terminal to the second terminal when the judging module determines to perform privacy protection on the first terminal.

The control module can comprise:

a first control sub-module, which can be configured to transmit a first control instruction to a VIG of the first terminal when the judging module determines to perform privacy protection on the first terminal, wherein the first control instruction is used to control the VIG of the first terminal to set a remote address of video transmitting address information of the first terminal to be invalid;

a second control sub-module, which can be configured to transmit a second control instruction to the media server, wherein the second control instruction is used to control the media server to analyze the substitute video and a substitute video transmitting address of the first terminal; and a third control sub-module, which can be configured to transmit a third control instruction to a VIG of the second terminal, wherein the third control instruction is used to control the VIG of the second terminal to set a remote address of video receiving address information of the second terminal to be the substitute video transmitting address which is analyzed by the media server.

The judging module can comprise:

an inquiring sub-module, which can be configured to inquire whether the first terminal is a subscriber under the privacy protection;

a receiving sub-module, which can be configured to receive an instruction for enabling the privacy protection; and a judging sub-module, which can be configured to determine to perform privacy protection on the first terminal when the inquiring sub-module inquires that the first terminal is a subscriber under the privacy protection and the receiving module receives the instruction for enabling the privacy protection from the first terminal; otherwise, determine not to perform privacy protection on the first terminal.

The control module can further comprise:

a first switching sub-module, which can be configured to transmit a first switching instruction to the VIG of the first terminal when receiving an instruction for stopping the privacy protection from the first terminal, wherein the first switching instruction can be used to control the VIG of the first terminal to set the remote address of the video transmitting address information of the first terminal as the video receiving address of the VIG of the second terminal;

a second switching sub-module, which can be configured to transmit a second switching instruction to the media server, wherein the second switching instruction can be used to control the media server to close a channel corresponding to the analyzed substitute video transmitting address of the first terminal; and a third switching sub-module, which can be configured to transmit a third switching instruction to the VIG of the second terminal, wherein the third switching instruction can be used to control the VIG of the second terminal to set the remote address of the video receiving address information of the second terminal as the video transmitting address of the VIG of the first terminal.

The present invention further provides a system for privacy protection in a video call, which is used to implement privacy protection in a video call between a first terminal and a second terminal, comprising:

an application server, configured to transmit a first control instruction to a VIG of the first terminal, transmit a second control instruction to a media server, and transmit a third control instruction to a VIG of the second terminal when determining to perform privacy protection on the first terminal;

the VIG of the first terminal, configured to set a remote address of video transmitting address information of the first terminal to be invalid according to the first control instruction;

the media server, configured to analyze a substitute video and substitute video transmitting address of the first terminal according to the second control instruction; and the VIG of the second terminal, configured to set a remote address of video receiving address information of the second terminal as the video transmitting address analyzed by the media server according to the third control instruction.

The application server can be further configured to transmit a first switching instruction to the VIG of the first terminal, transmit a second switching instruction to the media server and transmit a third switching instruction to the VIG of the second terminal when determining to stop performing privacy protection on the first terminal;

the VIG of the first terminal can be further configured to set the remote address of the video transmitting address information of the first terminal as the video receiving address of the VIG of the second terminal according to the first switching instruction;

the media server can be further configured to close a channel corresponding to the analyzed substitute video transmitting address according to the second switching instruction; and the VIG of the second terminal can be further configured to set the remote address of the video receiving address information of the second terminal as the video transmitting address of the VIG of the first terminal according to the third switching instruction.

With the method, application server and system for privacy protection in a video call provided by the present invention, in a video call between a first terminal and a second terminal, a substitute video analyzed by a media server is played to the second terminal user instead of playing a video of a first terminal user to the second terminal user, which not only avoids leakage of his own privacy and embarrassment, but also guarantees a normal operation of the video call in the scene that the first terminal user is inconvenient to show videos for example, having a bath, going to the washroom and so on, thus improving the convenience of 3G services.

PREFERRED EMBODIMENTS OF THE PRESENT INVENTION

The specific embodiments of the present invention will be described in detail in conjunction with accompanying drawings hereinafter. The present invention is applied in a 3G video call. With respect to FIG. 2, a system for privacy protection in a video call according to the present invention comprises a VIG, a 3G terminal and a media server, wherein the media server and the VIG decide which video to play according to user properties under the control of the application server. When a subscriber performs a video call, a subscribed video segment which is preset in the system is provided to the other party to substitute a real video image taken by a camera of his phone, and a dynamic switching can be performed between the real video and the substitute video in a process of the call. This method expands service functions of videophone services, and satisfies requirements of personalized videos of users.

Figure 2:
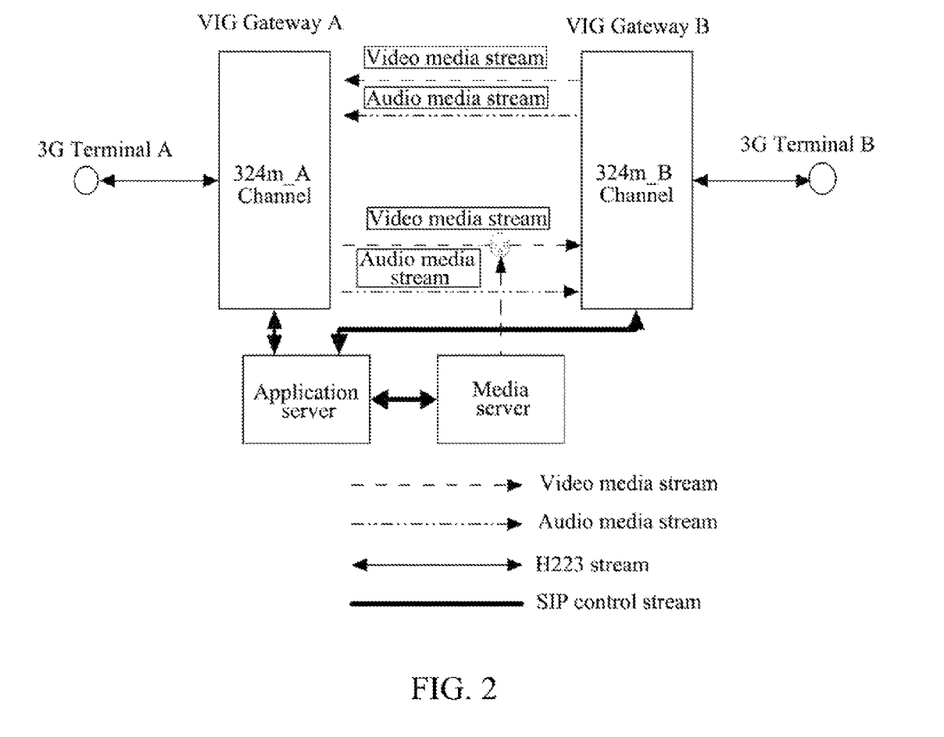
FIG. 2 illustrates a block diagram of a video call using privacy protection according to the present invention.

In the system, when the user does not want to transmit his own video at that time to the other party, the media server is needed to play a video segment which is pre-recorded by his own or selected by himself and stored in the media server to the opposite end to substitute his own video at that time. A user who wants to protect his/her privacy needs to be a subscriber of video substitute, and both the caller and the callee can be subscribers of the video substitute. When the callee answers the videophone, the subscriber of the video substitute firstly transmits a certain video segment to the opposite end to substitute his own real video, and if the callee wants to show his/her real video to the opposite end, the callee can push an indication button to switch to his real video and show it to the opposite end during the call. The VIG is needed to separate transmitting and receiving address information (IP+PORT) at the Internet Protocol (IP) side, that is, separating the video transmitting and video receiving address information, and separating the audio transmitting and audio receiving address information, instead of code stream address information with the same property not only having a function of transmitting code streams but also having a function of receiving code streams. In addition, remote IPs of audio and video address information of the same 324m channel may be not the same, for example, the remote end of the video address information of the 324m channel may be ip1 +port1, while the remote end of the audio address information may be ip2 +port2.

3G terminal A can be the first terminal, and 3G terminal B can also be the first terminal. Hereinafter, the present intention will be described by using 3G terminal A as the first terminal, and the implementation steps are specifically as follows.

When 3G terminal A calls 3G terminal B, the application server firstly judges whether A and B are subscribers of the video substitute.

If discovering that neither party is a subscriber, the application server will send a Session Initiation Protocol (SIP) control message to notify the VIG to transmit a real video to the other party, that is, the remote end of the transmitting audio/video address information of the 324m channel connected to A (324m_A channel for short hereinafter) corresponds to the receiving audio/video address information of the 324m channel connected to B (324m_B channel for short hereinafter), and the receiving audio/video address information of the 324m_A channel corresponds to the transmitting audio/video address information of the 324m_B channel. At this time, both parties show real videos to each other.

If the application server discovers that A is a subscriber of the video substitute (B is not a subscriber), and when B answers the phone, the application server will notify the media server and VIGs A and B through the SIP control message to perform the next action.

After receiving the SIP control message of the application server, the VIG A will set the remote address (IP+PORT) of the video transmitting address information of the 324m_A channel to be invalid; set the remote address information of the audio transmitting address information as audio receiving address information of the 324m_B channel; and set the remote address information of the audio/video receiving address information of the 324m_A channel as audio/video transmitting address information of the 324m_B channel.

After receiving the SIP control message of the application server, the media server will analyze video documents to be played and address information played to the remote end, and the remote address information of the transmitting video documents of the media server is the receiving video address information of the 324m_B channel.

After receiving the SIP control message of the application server, the VIG B will set the remote address information of audio/video transmitting address information of the 324m_B channel as the audio/video receiving address information of the 324m_A channel; and set the remote address of the video receiving address information of 324m_B channel as the video transmitting address of the media server which plays the substitute video of A, and set the remote address information of the audio receiving address information of the 324m_B channel as the audio transmitting address information of the 324m_A channel.

If the subscriber wants to transform or cancel the substitute video in a process of a call, a switching can be performed between the real video and the substitute video by pushing a specified button. If the application server receives an indication of canceling a switching from the substitute video to the real video in a call, the local and remote address information corresponding to the subscriber needs to be modified at this time. At this time, the address information of the transmitting video of the 324m_A channel and the address information of the receiving video of the 324m_B channel are remote address information of each other; and a channel of the media server which plays the substitute video of A is closed.

If B is also a subscriber of the video substitute, the address information can be rewritten in accordance with properties of A.

Hereinafter, the present invention will be described by example of both A, B being subscribers of video substitute. With respect to FIG. 3, the implementation steps are specifically as follows.

Figure 3:
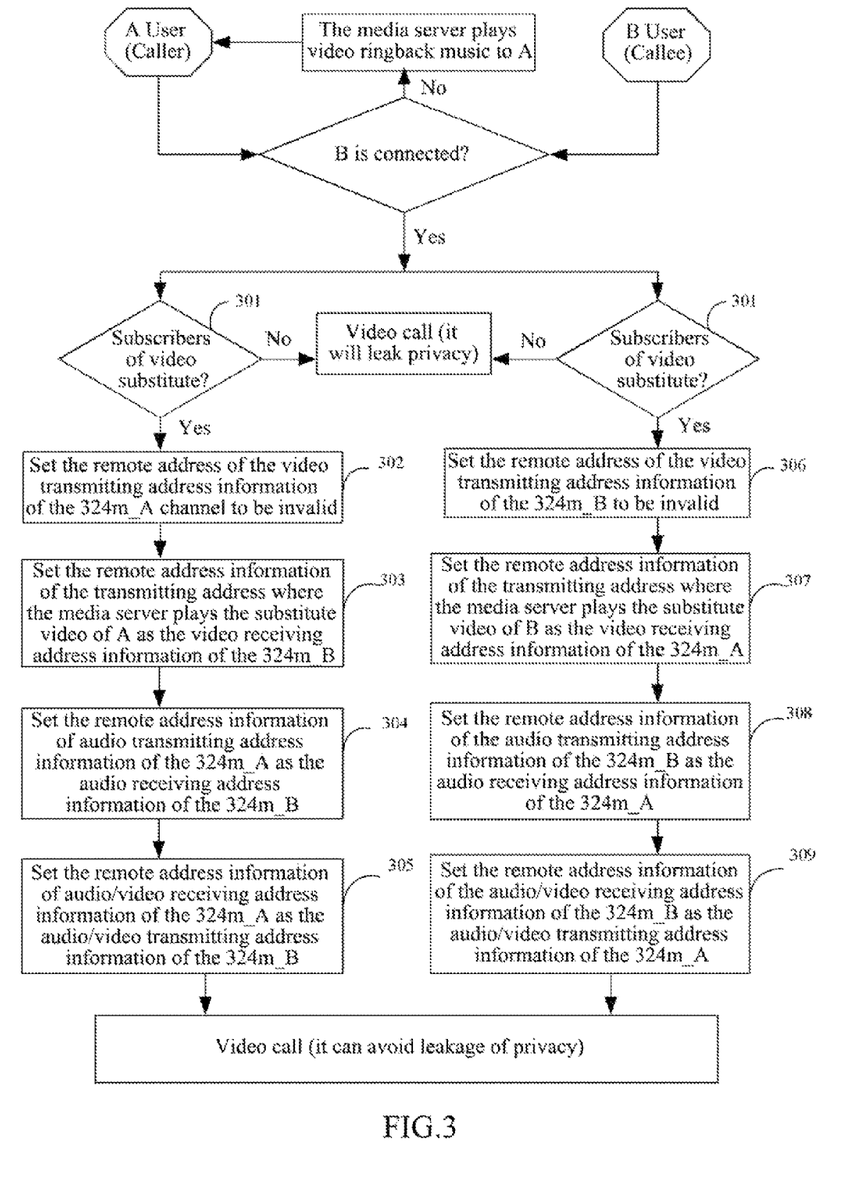
FIG. 3 illustrates a flowchart diagram of an embodiment of a method for privacy protection in a video call according to the present invention.

In 301, when 3G terminal A calls 3G terminal B, an application server firstly judges whether A and B are subscribers of video substitute.

If discovering that neither party is a subscriber, the application server will send a Session Initiation Protocol (SIP) control message to notify a VIG to transmit a real video to the other party, that is, a remote address information of transmitting audio/video address information of a 324m channel connected to A (324m_A channel for short hereinafter) corresponds to receiving audio/video address information of a 324m channel connected to B (324m_B channel for short hereinafter), and receiving audio/video address information of the 324m_A channel corresponds to transmitting audio/video address information of the 324m_B channel. At this time, both parties show real videos to each other.

If the application server discovers that A is a subscriber of the video substitute and B is also a subscriber, when B answers the phone, the application server will notify the media server and VIGs A and B through the SIP control message to perform the next action.

In 302, after receiving the SIP control message of the application server, the VIG A will set the remote address (IP+PORT) of the video transmitting address information of the 324m_A channel to be invalid.

In 303, after receiving the SIP control message of the application server, the media server will analyze video documents to be played by A to B and address information played to the remote end, and the remote address information of the transmitting video documents of the media server is the receiving video address information of the 324m_B channel.

In 304, after receiving the SIP control message of the application server, the VIG A will set the remote address information of audio transmitting address information of the 324m_A channel as the audio receiving address information of the 324m_B channel.

In 305, after receiving the SIP control message of the application server, the VIG A will set the remote address information of audio/video receiving address information of the 324m_A channel as the audio/video transmitting address information of the 324m_B channel.

In 306, after receiving the SIP control message of the application server, the VIG B will set the remote address (IP+PORT) of the video transmitting address information of the 324m_B channel to be invalid.

In 307, after receiving the SIP control message of the application server, the media server will analyze video documents to be played by B to A and address information played to the remote end, and the remote address information of the transmitting video documents of the media server is the receiving video address information of the 324m_A channel.

In 308, after receiving the SIP control message of the application server, the VIG B will set the remote address information of the audio transmitting address information of the 324m_B channel as the audio receiving address information of the 324m_A channel.

In 309, after receiving the SIP control message of the application server, the VIG B will set the remote address information of the audio/video receiving address information of the 324m_B channel as the audio/video transmitting address information of the 324m_A channel.

If the subscriber wants to transform or cancel the substitute video in a process of a call, a switching can be performed between the real video and the substitute video by pushing a specified button. If the application server receives an indication of canceling a switching from the substitute video to the real video in a call, the local and remote address information corresponding to the subscriber needs to be modified at this time. At this time, the address information of the transmitting video of the 324m_A channel and the address information of the receiving video of the 324m_B channel are remote address information of each other; and a channel of the media server which plays the substitute video of A is closed; and a channel of the media server which plays the substitute video of B is closed.

Figure 4:
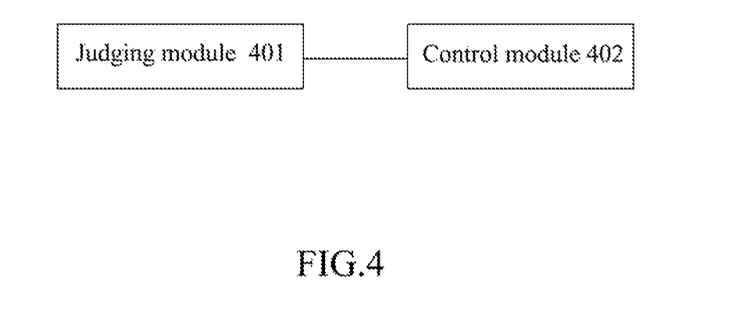
FIG. 4 illustrates a structural schematic diagram of an application server according to the present invention.

FIG. 4 illustrates a structural schematic diagram of an application server according to the present invention. The application server is used to implement privacy protection in a video call between a first terminal and a second terminal and comprises the following modules.

A judging module 401 is used to judge whether to perform privacy protection on the first terminal.

A control module 402 is used to play a substitute video in a media server as a video of the first terminal to the second terminal when the judging module determines to perform privacy protection on the first terminal.

Specifically, the control module can comprise the following sub-modules.

A first control sub-module is used to transmit a first control instruction to a VIG of the first terminal, wherein the first control instruction is used to control the VIG of the first terminal to set a remote address of video transmitting address information to be invalid.

A second control sub-module is used to transmit a second control instruction to the media server, wherein the second control instruction is used to control the media server to analyze the substitute video and a substitute video transmitting address.

A third control sub-module is used to transmit a third control instruction to a VIG of the second terminal, wherein the third control instruction is used to control the VIG of the second terminal to set a remote address of video receiving address information to be the substitute video transmitting address which is analyzed by the media server.

Furthermore, the judging module can comprises the following sub-modules.

An inquiring sub-module is used to inquire whether the first terminal is a subscriber under the privacy protection.

A receiving sub-module is used to receive an instruction for enabling the privacy protection.

A judging sub-module is used to determine to perform privacy protection on the first terminal when the inquiring sub-module inquires that the first terminal is a subscriber under the privacy protection and the receiving module receives the instruction for enabling the privacy protection from the first terminal; otherwise, determine not to perform privacy protection on the first terminal.

Furthermore, the control module can further comprise the following sub-modules.

A first switching sub-module is used to transmit a first switching instruction to the VIG of the first terminal when receiving an instruction for stopping the privacy protection from the first terminal, wherein the first switching instruction is used to control the VIG of the first terminal to set the remote address of the video transmitting address information as the video receiving address of the VIG of the second terminal.

A second switching sub-module is used to transmit a second switching instruction to the media server, wherein the second switching instruction is used to control the media server to close a channel corresponding to the analyzed substitute video transmitting address.

A third switching sub-module is used to transmit a third switching instruction to the VIG of the second terminal, wherein the third switching instruction is used to control the VIG of the second terminal to set the remote address of the video receiving address information as the video transmitting address of the VIG of the first terminal.

With respect to FIG. 2, a system for privacy protection in a video call is used to implement privacy protection in a video call between a first terminal (3G terminal A/3G terminal B) and a second terminal (3G terminal B/3G terminal A), and the system comprises the following modules.

An application server is used to transmit a first control instruction to a VIG of the first terminal, transmit a second control instruction to a media server, and transmit a third control instruction to a VIG of the second terminal when determining to perform privacy protection on the first terminal.

The VIG of the first terminal is used to set a remote address of video transmitting address information to be invalid according to the first control instruction.

The media server is used to analyze a substitute video and a substitute video transmitting address according to the second control instruction.

The VIG of the second terminal is used to set a remote address of video receiving address information as the video transmitting address analyzed by the media server according to the third control instruction.

Furthermore,

The application server is further used to transmit a first switching instruction to the VIG of the first terminal, transmit a second switching instruction to the media server and transmit a third switching instruction to the VIG of the second terminal when receiving an instruction for stopping the privacy protection from the first terminal.

The VIG of the first terminal is used to set the remote address of the video transmitting address information as the video receiving address of the VIG of the second terminal according to the first switching instruction.

The media server is used to close a channel corresponding to the analyzed substitute video transmitting address according to the second switching instruction.

The VIG of the second terminal is used to set the remote address of the video receiving address information as the video transmitting address of the VIG of the first terminal according to the third switching instruction.

The above description is only the specific embodiments of the present invention. It should be pointed out that, for a person having ordinary skill in the art, a number of improvements and polishes can further be made without departing from the principle of the present invention, and these improvements and polishes should also be construed as being within the protection scope of the present invention.

Industrial Applicability

With the method, application server and system for privacy protection in a video call provided by the present invention, in a video call between a first terminal and a second terminal, a substitute video analyzed by a media server is played to the second terminal user instead of playing a video of a first terminal user to the second terminal user, which not only avoids leakage of his own privacy and embarrassment, but also guarantees a normal operation of the video call in the scene that the first terminal user is inconvenient to show videos for example, having a bath, going to the washroom and so on, thus improving the convenience of 3G services.

What is claimed is:

1. A method for privacy protection in a video call, which is applied in a video call between a first terminal and a second terminal, comprising:
    judging whether to perform privacy protection on the first terminal; and
    when determining to perform privacy protection on the first terminal, playing a substitute video in a media server as a video of the first terminal to the second terminal;
    wherein said step of playing a substitute video in a media server as a video of the first terminal to the second terminal comprises:
    transmitting a first control instruction to a video gateway of the first terminal, wherein the first control instruction is used to control the video gateway of the first terminal to set a remote address of video transmitting address information of the first terminal to be invalid;
    transmitting a second control instruction to the media server, wherein the second control instruction is used to control the media server to analyze the substitute video and the substitute video transmitting address; and
    transmitting a third control instruction to a video gateway of the second terminal, wherein the third control instruction is used to control the video gateway of the second terminal to set a remote address of video receiving address information of the second terminal to be the video transmitting address of the substitute video which is analyzed by the media server.

2. The method according to claim 1, wherein said step of judging whether to perform privacy protection on the first terminal comprises:
    judging whether the first terminal is a subscriber under the privacy protection, and whether an instruction for enabling the privacy protection is received from the first terminal;
    and if the first terminal is a subscriber and the instruction for enabling the privacy protection is received, determining to perform privacy protection on the first terminal; otherwise, determining not to perform privacy protection on the first terminal.

3. The method according to claim 2, further comprising:
    when receiving an instruction for stopping the privacy protection from the first terminal, transmitting a first switching instruction to the video gateway of the first terminal, wherein the first switching instruction is used to control the video gateway of the first terminal to set the remote address of the video transmitting address information of the first terminal as a video receiving address of the video gateway of the second terminal;
    transmitting a second switching instruction to the media server, wherein the second switching instruction is used to control the media server to close a channel corresponding to the analyzed video transmitting address of the substitute video; and
    transmitting a third switching instruction to the video gateway of the second terminal, wherein the third switching instruction is used to control the video gateway of the second terminal to set the remote address of the video receiving address information of the second terminal as the video transmitting address of the video gateway of the first terminal.

4. The method according to claim 1, wherein the first control instruction, the second control instruction and the third control instruction are SIP (session initiation protocol) messages.

5. The method according to claim 3, wherein the first switching instruction, the second switching instruction and the third switching instruction are SIP (session initiation protocol) messages.

6. An application server, which is used to implement privacy protection in a video call between a first terminal and a second terminal, comprising:
    a judging module, configured to judge whether to perform privacy protection on the first terminal; and
    a control module, configured to play a substitute video in a media server as a video of the first terminal to the second terminal when the judging module determines to perform privacy protection on the first terminal;
    wherein the control module comprises:
    a first control sub-module, configured to transmit a first control instruction to a video gateway of the first terminal when the judging module determines to perform privacy protection on the first terminal, wherein the first control instruction is used to control the video gateway of the first terminal to set a remote address of video transmitting address information of the first terminal to be invalid;
    a second control sub-module, configured to transmit a second control instruction to the media server, wherein the second control instruction is used to control the media server to analyze the substitute video and the substitute video transmitting address of the first terminal; and
    a third control sub-module, configured to transmit a third control instruction to a video gateway of the second terminal, wherein the third control instruction is used to control the video gateway of the second terminal to set a remote address of video receiving address information of the second terminal to be the substitute video transmitting address which is analyzed by the media server.

7. The application server according to claim 6, wherein the judging module comprises:
    an inquiring sub-module, configured to inquire whether the first terminal is a subscriber under the privacy protection;
    a receiving sub-module, configured to receive an instruction for enabling the privacy protection; and
    a judging sub-module, configured to determine to perform privacy protection on the first terminal when the inquiring sub-module inquires that the first terminal is the subscriber under the privacy protection and the receiving module receives the instruction for enabling the privacy protection from the first terminal; otherwise, determine not to perform privacy protection on the first terminal.

8. The application server according to claim 7, wherein the control module further comprises:
a first switching sub-module, configured to transmit a first switching instruction to the video gateway of the first terminal when receiving an instruction for stopping the privacy protection from the first terminal, wherein the first switching instruction is used to control the video gateway of the first terminal to set the remote address of the video transmitting address information of the first terminal as a video receiving address of the video gateway of the second terminal;
a second switching sub-module, configured to transmit a second switching instruction to the media server, wherein the second switching instruction is used to control the media server to close a channel corresponding to the analyzed substitute video transmitting address of the first terminal; and
a third switching sub-module, configured to transmit a third switching instruction to the video gateway of the second terminal, wherein the third switching instruction is used to control the video gateway of the second terminal to set the remote address of the video receiving address information of the second terminal as the video transmitting address of the video gateway of the first terminal.

9. A system for privacy protection in a video call, which is used to implement privacy protection in a video call between a first terminal and a second terminal, comprising:
an application server, configured to transmit a first control instruction to a video gateway of the first terminal, transmit a second control instruction to a media server, and transmit a third control instruction to a video gateway of the second terminal when determining to perform privacy protection on the first terminal;
the video gateway of the first terminal, configured to set a remote address of video transmitting address information of the first terminal to be invalid according to the first control instruction;
the media server, configured to analyze a substitute video and the substitute video transmitting address of the first terminal according to the second control instruction; and
the video gateway of the second terminal, configured to set a remote address of video receiving address information of the second terminal as the video transmitting address analyzed by the media server according to the third control instruction; wherein,
the application server is further configured to transmit a first switching instruction to the video gateway of the first terminal, transmit a second switching instruction to the media server and transmit a third switching instruction to the video gateway of the second terminal when determining to stop performing privacy protection on the first terminal;
the video gateway of the first terminal is further configured to set the remote address of the video transmitting address information of the first terminal as a video receiving address of the video gateway of the second terminal according to the first switching instruction;
the media server is further configured to close a channel corresponding to the analyzed substitute video transmitting address according to the second switching instruction; and
the video gateway of the second terminal is further configured to set the remote address of the video receiving address information of the second terminal as the video transmitting address of the video gateway of the first terminal according to the third switching instruction.

* * * * *